US011705595B2

(12) United States Patent
Kang et al.

(10) Patent No.: US 11,705,595 B2
(45) Date of Patent: Jul. 18, 2023

(54) POUCH CASE, POUCH TYPE SECONDARY BATTERY AND MANUFACTURING METHOD THEREOF

(71) Applicant: SK INNOVATION CO., LTD., Seoul (KR)

(72) Inventors: Hee Gyoung Kang, Daejeon (KR); Tae Ii Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/493,953

(22) Filed: Oct. 5, 2021

(65) Prior Publication Data

US 2022/0029228 A1 Jan. 27, 2022

Related U.S. Application Data

(63) Continuation of application No. 17/031,338, filed on Sep. 24, 2020, now Pat. No. 11,171,376.

(30) Foreign Application Priority Data

Sep. 30, 2019 (KR) .................. 10-2019-0121140

(51) Int. Cl.
*H01M 50/183* (2021.01)
*H01M 10/04* (2006.01)
(Continued)

(52) U.S. Cl.
CPC ..... *H01M 50/183* (2021.01); *H01M 10/0436* (2013.01); *H01M 10/0585* (2013.01);
(Continued)

(58) Field of Classification Search
CPC .................................. H01M 50/183
See application file for complete search history.

(56) References Cited

U.S. PATENT DOCUMENTS

2012/0148888 A1 6/2012 Yun
2013/0101894 A1 4/2013 Baba et al.
(Continued)

FOREIGN PATENT DOCUMENTS

JP 2004-071301 A 3/2004
KR 10-2007-0006253 A 1/2007
(Continued)

OTHER PUBLICATIONS

Notice of Allowance for the Korean Patent Application No. 10-2019-0121140 issued by the Korean Intellectual Property Office dated Oct. 26, 2021.
(Continued)

*Primary Examiner* — Brian R Ohara
(74) *Attorney, Agent, or Firm* — IP & T Group LLP

(57) ABSTRACT

Provided are a pouch case for a pouch type secondary battery in which one corner is in close contact with a cooling plate and a pouch type secondary battery including the same. In the pouch case, by controlling a shape relation among a forming portion formed to have a non-zero depth determined in advance at a center to accommodate one side of an electrode assembly, a receiving portion in surface contact with a side surface of the electrode assembly at the time of sealing the pouch case, and a sealing portion for sealing opposing ends of the forming portion and the electrode assembly, a size of a sealing protrusion formed after the electrode assembly is packaged through mechanical properties of a metal laminate sheet and a simplified die and punch may be minimized.

6 Claims, 12 Drawing Sheets

(51) Int. Cl.
　　　*H01M 10/0585*　　　(2010.01)
　　　*H01M 50/531*　　　 (2021.01)
　　　*H01M 50/543*　　　 (2021.01)
　　　*H01M 50/557*　　　 (2021.01)

(52) U.S. Cl.
　　　CPC ....... *H01M 50/531* (2021.01); *H01M 50/543*
　　　　　　　　(2021.01); *H01M 50/557* (2021.01)

(56) References Cited

U.S. PATENT DOCUMENTS

| | | |
|---|---|---|
| 2018/0331336 A1 | 11/2018 | Choi et al. |
| 2020/0365836 A1* | 11/2020 | Jung .................. H01M 50/121 |

FOREIGN PATENT DOCUMENTS

| | | |
|---|---|---|
| KR | 10-2007-0102768 A | 10/2007 |
| KR | 10-1253671 B1 | 4/2013 |
| KR | 10-2019-0010434 A | 1/2019 |
| WO | 2017/078437 A1 | 5/2017 |

OTHER PUBLICATIONS

Notice of Allowance for the Korean Patent Application No. 10-2021-0096315 issued by the Korean Intellectual Property Office dated Nov. 20, 2022.

Office Action for the U.S. Appl. No. 17/494,052 issued by the USPTO dated Feb. 27, 2023.

\* cited by examiner

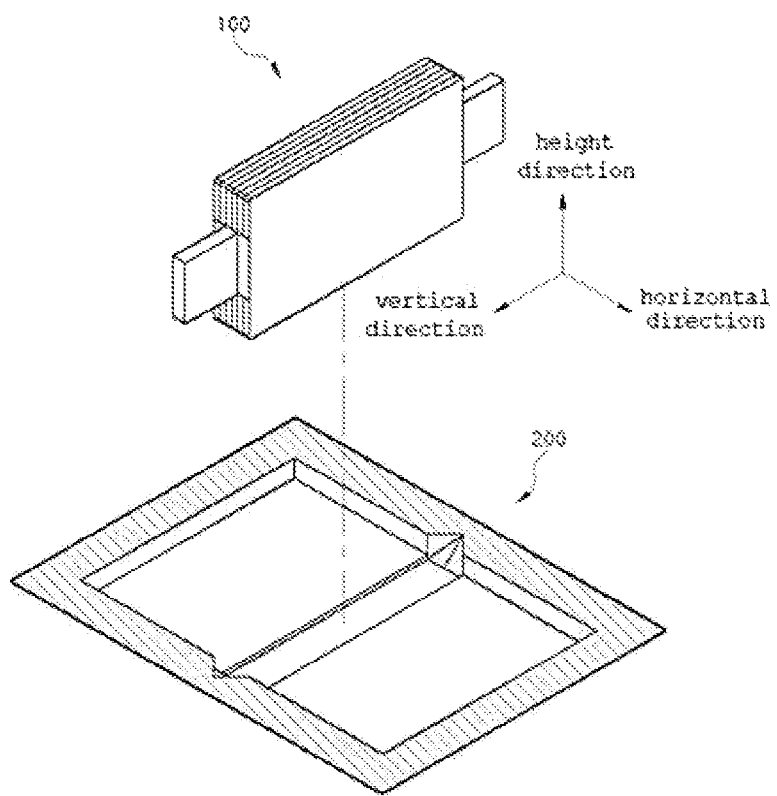

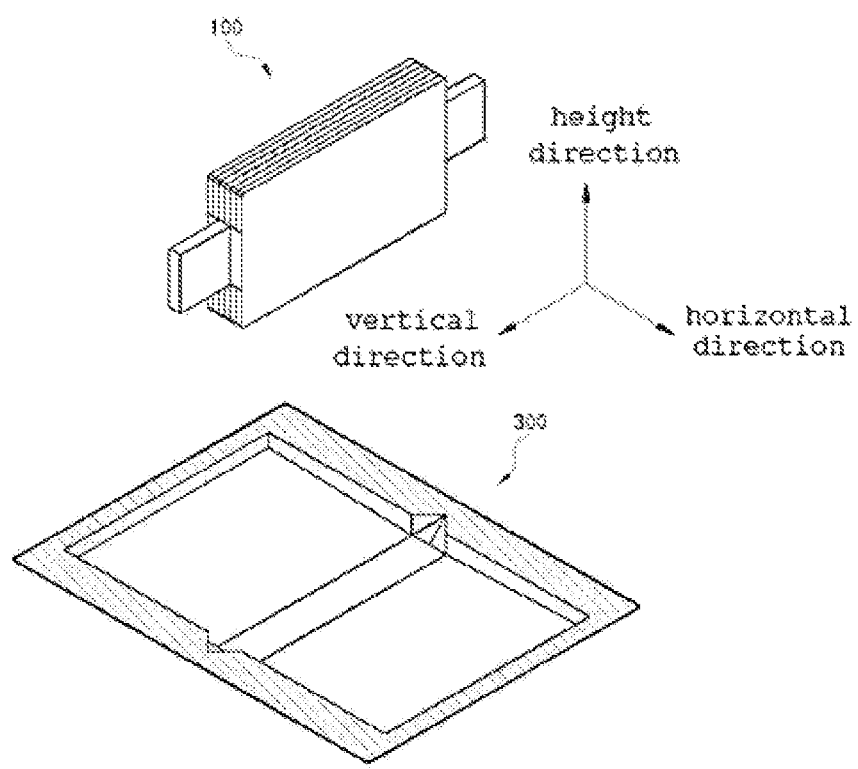

POUCH CASE, POUCH TYPE SECONDARY BATTERY AND MANUFACTURING METHOD THEREOF

CROSS-REFERENCE TO RELATED APPLICATION

The present application is a Continuation of U.S. application Ser. No. 17/031,338 filed on Sep. 24, 2020, which claims priority under 35 U.S.C. § 119 to Korean Patent Application No. 10-2019-0121140, filed on Sep. 30, 2019, in the Korean Intellectual Property Office, the disclosure of which is incorporated herein by reference in its entirety.

TECHNICAL FIELD

The following disclosure relates to a pouch case, a pouch type secondary battery, and a manufacturing method thereof and in particular, to a pouch type secondary battery in which one side surface is in close contact with a cooling plate and a method for manufacturing the same.

BACKGROUND

A secondary battery cell is formed by enclosing an electrode assembly including an anode and a cathode, a separator, and an electrolyte in a case. The electrode assembly may be classified into a winding jelly-roll type rolled with a separator between sheet type anode and cathode coated with an active material, a stack jelly-roll type which a plurality of positive and negative electrode bodies are sequentially stacked in a state where a separator is interposed, and a stack-folding jelly-roll type in which stack type unit cells are wound by a long separator.

Such an electrode assembly is packed in a container formed by press-working a metal to have a cylindrical or rectangular parallelepiped shape or packed by a pouch formed of a multi-laminate film obtained by extruding a polymer raw material so as to be used. Among them, pouch type batteries have been widely used for the reasons of low manufacturing cost, a low weight, and high formability.

As shown in FIG. 1A, related art pouch type secondary battery 10 includes an electrode assembly 1 and a pouch case 2 for sealing the electrode assembly 1, and the pouch case 2 includes a receiving portion 2a for receiving the electrode assembly 1 and a sealing portion 2b for sealing the electrode assembly 1. The related art pouch type secondary battery 10 is manufactured by receiving the electrode assembly 1 in the receiving portion 2a of the pouch case 2, sealing an outer periphery of the sealing portion 2b, and then performing sealing such that one surface thereof has a flat surface as shown in FIG. 1B.

As described above, the electrode assembly 1 enclosed on three sides by the pouch case 2 may reduce a sealed side area, thereby increasing actual energy density in the same volume. However, when a cooling plate of a battery module and the related art pouch type secondary battery 10 are installed, interference occurs with the cooling plate by a sealing protrusion 3 called a delta fin shown in FIG. 1B, lowering cooling efficiency and energy density of the battery module.

Further, the pouch case is formed of a metal laminate film including base layer formed of a heat-adhesive polyolefin-based resin to serve as a sealing material for the electrode assembly, an aluminum metal layer for blocking gas and moisture, and an adhesive layer adhering the base layer and the metal layer. With the multi-laminate film, generally, a pouch case is formed by a plurality of metal dies corresponding to a space accommodating the electrode assembly at a predetermined position of the multi-laminate film through punching several times through deep drawing using a die and a punch in a forming mold.

In this case, since corresponding facilities and processes are added, productivity decreases, and a size and design of a secondary battery must be changed as often as a development speed of electronic devices, leading to a problem that detailed shapes of a receiving portion or the like formed on the secondary battery pouch is also to be changed.

SUMMARY

An embodiment of the present disclosure is directed to providing a pouch type secondary battery in which one side of a pouch is tightly attached to a cooling plate by adjusting a size and a height of sealing protrusions provided at vertices of opposing ends in advance when sealing the pouch to seal an electrode assembly, thereby increasing cooling efficiency, and a method of manufacturing a pouch case for minimizing the sealing protrusions through a simple forming process.

In one general aspect, a pouch case for enclosing an electrode assembly including a plurality of electrode bodies stacked with a separator interposed therebetween, includes: a forming portion formed to have a non-zero depth determined in advance at a center and accommodating one corner of the electrode assembly; sealing portion provided at an outer periphery of the forming portion and sealing the accommodated electrode assembly; a notch portion provided between the sealing portion and opposing ends of the forming portion in a vertical direction; and a receiving portion brought into surface contact with a side plane of the electrode assembly when the pouch case is sealed, wherein the forming portion includes a bottom portion in which the side of the electrode assembly is seated and height portions upwardly extending from opposing ends of the bottom portion in a horizontal direction, the receiving portion is connected to both sides of the forming portion and includes a forming connection portion formed on one side and connected to the height portion and a sealing connection portion formed on the other side and connected to the sealing portion to have a step with the forming portion, and the notch portion is connected with a non-zero inclination determined in advance from opposing ends of the bottom portion of the forming portion to the sealing portion.

As another embodiment, a forming portion of a pouch case of the present disclosure may include a bottom portion in which a corner of the electrode assembly is seated, the receiving portion may be connected at both ends of the forming portion and include a forming connection portion formed on one side and connected to the forming portion and a sealing connection portion formed on the other side and connected to the sealing portion to have a non-zero angle determined in advance with respect to the forming portion, and the notch portion may be connected with a non-zero inclination determined in advance from opposing ends of the bottom portion of the forming portion to the sealing portion.

As another embodiment, a forming portion of a pouch case of the present disclosure may include a bottom portion in which the side of the electrode assembly is seated and height portions upwardly extending from opposing ends of the bottom portion in a horizontal direction, a receiving portion may be connected to both sides of the forming portion and include a forming connection portion formed on one side and connected to the height portion and a sealing connection portion formed on the other side and connected to the sealing portion to have a step with the forming portion, and the notch portion may be spaced apart from the opposing ends of the bottom portion of the forming portion by a non-zero distance determined in advance to have a step with the bottom portion.

As another embodiment, a forming portion of a pouch case of the present disclosure may include a bottom portion in which an side of the electrode assembly is seated, the receiving portion may be connected at both ends of the forming portion and include a forming connection portion formed on one side and connected to the forming portion and a sealing connection portion formed on the other side and connected to the sealing portion to have a non-zero angle determined in advance with respect to the forming portion, and the notch portion may be spaced apart from the opposing ends of the bottom portion of the forming portion by a non-zero distance determined in advance to have a step with the bottom portion.

The bottom portion of the forming portion may have an uneven portion as a lower surface thereof protrudes or is depressed.

The protruding or depressed form of the uneven portion may be maintained in a process of packaging the electrode assembly, and the uneven portion may be spread at the time of sealing the pouch case.

In another general aspect, a pouch type secondary battery includes; an electrode assembly including a plurality of electrode bodies stacked with a separator interposed therebetween and the pouch case described above.

A vertical length of the bottom portion in which the electrode assembly is seated may be smaller than or equal to a vertical length of the receiving portion.

Electrode tabs may be drawn out in opposing directions of the electrode assembly, and a horizontal length of the electrode assembly parallel to the direction of the electrode tabs drawn out in the opposing directions of the electrode assembly may be larger than a length of the electrode assembly in a height direction.

In another general aspect, a pouch type secondary battery module includes: the pouch type secondary battery; and a cooling plate cooling the pouch type secondary battery, wherein the forming portion of the pouch case is in surface contact with the cooling plate.

In another general aspect, a method of manufacturing a pouch type secondary battery includes: a sheet arrangement operation of disposing a metal laminate sheet; a forming operation of pressing the sheet with a punch to form a shape of a pouch case in a single process under preset temperature and pressure pressing conditions by predicting measured mechanical properties of the sheet; an electrode assembly insertion operation of inserting and aligning one side of an electrode assembly to the forming portion of the pouch case described above; and a pouch case sealing operation of sealing a sealing portion of the pouch case.

The method may further include: a preparation operation of preparing a die having a cavity formed at the center before the sheet arrangement operation, wherein the forming operation is performed by pressing the punch between the cavity after the sheet arrangement operation.

Other features and aspects will be apparent from the following detailed description, the drawings, and the claims.

BRIEF DESCRIPTION OF THE DRAWINGS

FIG. 5 is a perspective view before sealing of a pouch type secondary battery according to another embodiment of the present disclosure.

DETAILED DESCRIPTION OF EMBODIMENTS

Hereinafter, the technical spirit of the present disclosure will be described in detail with reference to the accompanying drawings. The accompanying drawings are only examples illustrated to describe the technical spirit of the present disclosure in detail, so the technical spirit of the present disclosure is not limited to the form of the accompanying drawings.

Figures 1, 9:
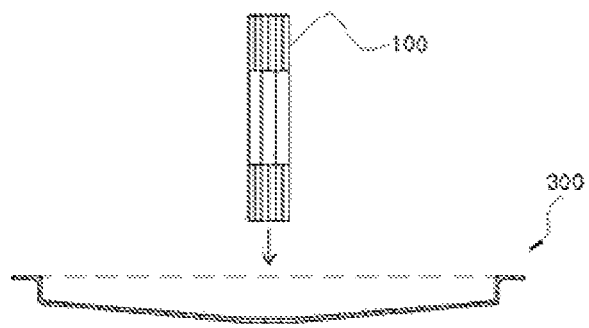
FIGS. 9-1 to 9-4 are conceptual diagrams showing a method of packaging a pouch type secondary battery of the present disclosure.
Figures 2, 9:
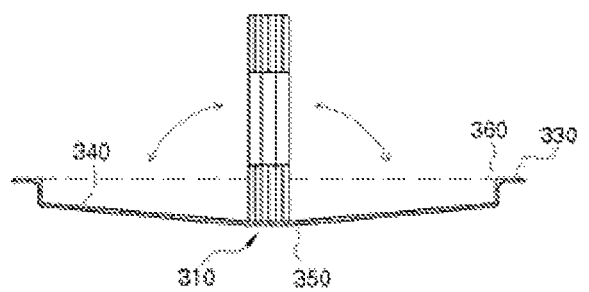
FIG. 2 is a perspective view before sealing of a pouch type secondary battery according to an embodiment of the present disclosure.

Prior to the description, a vertical direction, a horizontal direction, and a height direction expressed in a coordinate system shown in FIG. 2 are referred to as reference in the description of an electrode assembly and a pouch case in the claims and descriptions of FIGS. 2 to 7. The vertical direction, the horizontal direction, and the height direction indicate directions extending to both sides in the displayed direction.

An Embodiment of Pouch Type Secondary Battery According to Present Disclosure

As shown in FIG. 2, a pouch type secondary battery of the present disclosure includes an electrode assembly 100 and a pouch case 200. Each component is described in detail as follows.

The electrode assembly 100 includes a plurality of electrode bodies stacked with a separator interposed therebetween. The electrode assembly 100 illustrated in FIG. 2 may be a jelly roll type electrode assembly wound with a separator between a positive electrode and a negative electrode of a sheet type coated with an active material, or may be various types of electrode body assemblies.

The pouch case 200 serves to enclose and seal the electrode assembly 100 and may include an inner resin layer abutting the electrode assembly 100, an aluminum layer maintaining mechanical strength and preventing inflow of moisture and oxygen, and an outer resin layer acting as a protective layer.

Figure 1A:
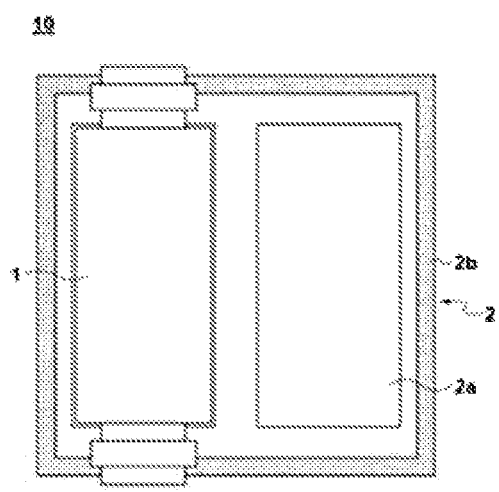
FIGS. 1A and 1B are views showing a pouch type secondary battery of the related art.
Figure 1B:
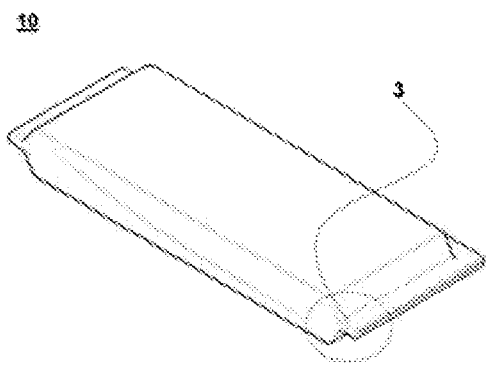
Figure 3A:
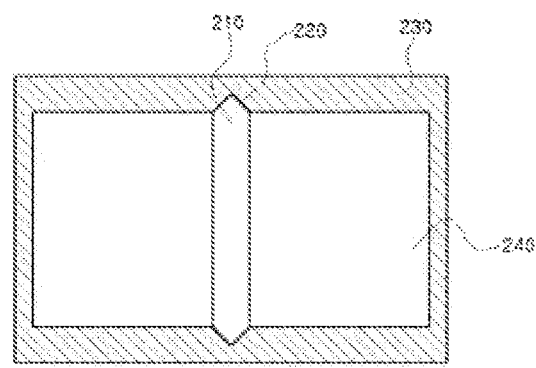
FIGS. 3A and 3B are a plan view and a side view, respectively, before sealing of a pouch type secondary battery according to an embodiment of the present disclosure.
Figure 3B:
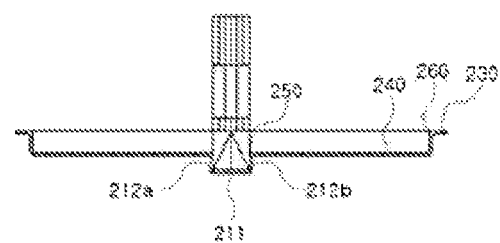

FIGS. 3A and 3B show a detailed configuration of the pouch case 200, and as shown, the pouch case 200 of the pouch type secondary battery 1000 of the present disclosure includes a forming portion 210, a notch portion 220, a sealing portion 230, and a receiving portion 240.

In FIG. 3A, the pouch case 200 is shown in an unfolded state prior to enclosing the electrode assembly 100. In FIG. 3B the electrode assembly 100 is positioned inside the forming portion 210. In an unfolded position, the pouch case 200 may comprise a receiving portion 240 for accommodating the electrode assembly, and a sealing portion 230 formed at a periphery of the receiving portion 240, the sealing portion 230 forming a step with the receiving portion 240. The pouch case 200 may also include a forming portion 210 formed at a center of the pouch case and separating the receiving portion 240 into first and second parts positioned on opposite sides of the forming portion 210. The forming portion may have a depth sufficient to tightly accommodate one side portion of the electrode assembly as shown in FIG. 3B.

The pouch case 200 may further include a notch 220 (also referred to as a notch portion) formed in the sealing portion 230 and extending from a boundary between the forming portion 210 partially into the sealing portion 230 along a longitudinal axis of the forming portion 230.

The forming portion 210 may have a bottom portion 211 positioned lower than a bottom surface of the receiving portion 240 and height portions 212a and 212b connecting the bottom portion 211 with the bottom surface of the receiving portion 240.

In the illustrated embodiment of FIGS. 3A and 3B, the notch has triangle shape from a top view with a vertex of the triangle positioned inside the sealing portion 230 and a base of the triangle positioned at the boundary with the forming portion 210. The boundary of the notch with the forming portion 210 is aligned with a boundary of the sealing portion 230 with the receiving portion 240.

The notch 220 has a half pyramid shape with a rectangular base. An apex of the pyramid is positioned on the sealing portion so that when the pouch case is wrapped around the electrode assembly and the sealing portion 230 is sealed the notch 220 has a full pyramid shape.

The forming portion 210 has a recess shape having a non-zero depth determined in advance at the center of the pouch case 200 and includes a bottom portion 211 and height portions 212a and 212b.

The bottom portion 211 serves to form a bottom of the forming portion 210. The bottom portion 211 may be formed to have a width corresponding to a thickness of the electrode assembly 100 and a length corresponding to a vertical length of the electrode assembly 100. More specifically, a vertical length of the bottom portion 211 on which the electrode assembly 100 is seated may be smaller than or equal to a vertical length of the receiving portion 240. Further, the bottom portion 211 may include an uneven portion 213 which protrudes or is depressed.

The height portions 212a and 212b are formed at both ends of the bottom portion 211 in the horizontal direction and extend upward. Therefore, the forming portion 210 may be formed by the bottom portion 211 and the height portions 212a and 212b.

The forming portion 210 provides a position at which one side of the electrode assembly 100 is inserted during a manufacturing process of the pouch type secondary battery 1000 and serves to support the inserted electrode assembly 100, thereby facilitating manufacturing of the secondary battery.

The notch portion 220 serves to control wrinkle of the sealing protrusion formed as the pouch case 200 seals the electrode assembly 100 from three sides and is connected with a non-zero inclination determined in advance from both ends of the bottom portion 211 of the forming portion 210 in the vertical direction to the sealing portion 230.

In an embodiment, the notch portion 220 may be formed to extend from both ends of the forming portion 210 in the vertical direction to protrude from the sealing portion 230 and may be designed in consideration of a detailed shape wrinkled after being bent based on physical characteristics of the metal laminate sheet which is a material of the pouch case 200 and a process environment in which the electrode assembly 100 is sealed. That is, the notch portion 220 serves as a guide to allow the sealing portion 230 and the receiving portion 240 to easily enclose the electrode assembly 100 on both sides when the three sides of the electrode assembly 100 are sealed, and serve to allow the sealing protrusion formed after sealing to be formed at a position higher than the bottom surface of the forming portion 210.

Accordingly, the secondary battery may be in tighter surface contact with a cooling plate, thus increasing cooling efficiency and space efficiency and increasing energy density of the secondary battery. Therefore, the detailed shape of the notch portion 220 is preferably limited in association with the forming portion 210 and the sealing portion 230, and the protruding shape of the notch portion 220 may not be limited to those illustrated in FIGS. 2 and 3 and may have various shapes consistent with the teachings herein.

The sealing portion 230 is a predetermined extra space provided at an outer periphery of the pouch case 200 when three sides of the electrode assembly 100 are sealed with the pouch case 200, and serves to maintain airtightness of the electrode assembly 100 through heat fusion. Therefore, the sealing portion 230 is preferably provided in a range in which minimum airtightness of the electrode assembly 100 is maintained, and only a portion of the sealing portion may be heat-fused in the range in which airtightness is maintained.

The receiving portion 240 is formed to abut the electrode assembly 100 and to fix a received position of the electrode assembly when the three-side sealing is performed on the electrode assembly 100 with the pouch case 200.

A method of fixing the position at which the electrode assembly 100 is received using the receiving portion 240 will be described in more detail as follows. When the electrode assembly 100 is inserted into the forming portion 210 of the pouch case 200, the bottom portion 211 and the side of the electrode assembly 100 at each other and the electrode assembly 100 is supported by the height portions 212a and 212b formed on both sides thereof so as to be inserted into the forming portion 210. Here, inserting and supporting of the electrode assembly 100 may be assisted by a forming connection portion 250 formed to have a bent shape in which the height portions 212a and 212b and the receiving portion 240 are connected. Thereafter, the receiving portion 240 performs enclosing in the direction of the electrode assembly 100 such that the sealing portion 230 abut each other in three sides. Here, enclosing of the electrode assembly 100 may be assisted, while a sealing connection portion 260 formed due to a step between the receiving portion 240 and the sealing portion 230 is put on the electrode assembly 100. Accordingly, the receiving position of the electrode assembly 100 may be fixed by the receiving portion 240.

Figure 4A:
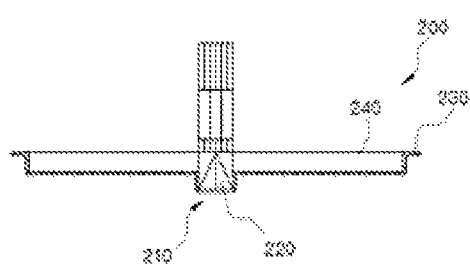
FIGS. 4A to 4E are views showing a protruding and depressed portion according to an embodiment of the present disclosure.
Figure 4B:
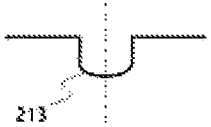
Figure 4C:
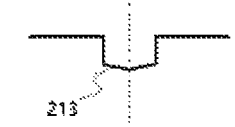
Figure 4D:
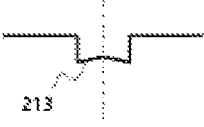
Figure 4E:
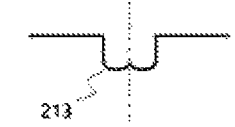

As shown in FIG. 4A, the side of the electrode assembly 100 is inserted into the recess of the forming portion 210, thus determining an arrangement position. Here, in order for the pouch case 200 to easily seal the electrode assembly 100 from three sides, the uneven portion 213 curved upward or downward may be formed on a lower surface of the forming portion 210. The uneven portion 213 formed on the lower surface of the forming portion 210 may be engaged with the bent portion of the notch portion 220 formed at opposing ends of the forming portion 210 to reduce a size and a height of the sealing protrusion formed at the corner folded when the electrode assembly 100 is enclosed and sealed with the pouch case 200. In addition, the uneven portion 213 may absorb dimensional deviations of the pouch case 200 that occur for the reasons of process errors, so that the pouch case 200 may stably enclose and seal the three sides of the electrode assembly 100.

FIGS. 4B to 4E show some examples of the uneven portion 213. The uneven portion 213 is formed in a shape protruding upward from the lower surface of the forming portion 210 or in a shape protruding downward from the lower surface of the forming portion 210. In a case of a shape protruding upward from the lower surface of the forming portion 210, the uneven portion 213 may serve to more tightly attach the pouch case 200 to the electrode assembly 100 through elastic energy stored in the process of forming the uneven portion 213 when the electrode assembly 100 is inserted into the forming portion 210. In addition, the uneven portion 213 may have a plurality of protruding or recessed shapes.

Another Embodiment of Pouch Type Secondary Battery According to Present Disclosure FIG. 5 relates to a pouch type secondary battery according to another embodiment of the present disclosure, which includes an electrode assembly 100 and a pouch case 300. The same description as above will be omitted.

Figure 6A:
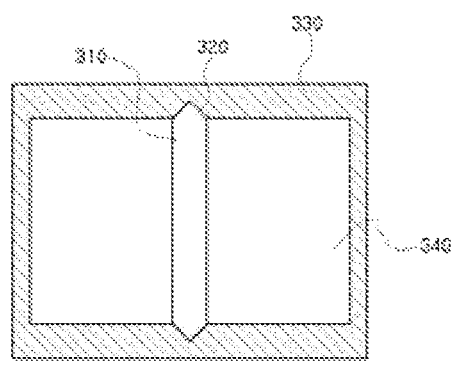
FIGS. 6A and 6B are a plan view and a side view, respectively, before sealing of a pouch type secondary battery according to another embodiment of the present disclosure.
Figure 6B:
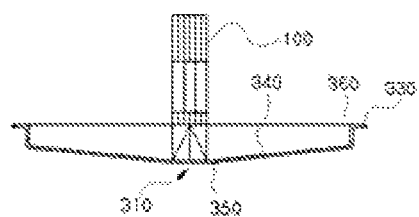

FIG. 6A is a plan view before sealing of the pouch case 300, and the pouch case 300 includes a forming portion 310, a notch portion 320, a sealing portion 330, and a receiving portion 340. Each part will be described in detail with reference to FIG. 6B.

The forming portion 310 is formed of a bottom having a predetermined space at the center of the pouch case 300. The forming portion 310 provides a position at which the electrode assembly 300 is disposed during a manufacturing process of the pouch type secondary battery 1000, and serves to easily fix the electrode assembly 300.

The notch portion 320 serves to control a shape of a sealing protrusion formed after the electrode assembly 100 is sealed on three sides by the pouch case 300. The notch portion 320 may be connected to opposing ends of the forming portion 310 in the vertical direction, and is formed in a shape protruding into the sealing portion 330.

The receiving portion 340 is formed to abut the electrode assembly 100 when the electrode assembly 100 disposed in the forming portion 310 is sealed on three sides by the pouch case 300, and serves to fix a receiving position of the electrode assembly 100.

Here, a method for limiting the position at which the electrode assembly 100 is received to the receiving portion 340 will be described in detail as follows. The side of the electrode assembly 100 is disposed to abut the forming portion 310 of the pouch case 300. Here, a forming connection portion 350 connecting the forming portion 310 and the receiving portion 340 assists the receiving portion 340 to form a predetermined angle with the forming portion 310 and maintain an inclined surface. The receiving portion 340 extending from the forming connection portion 350 may be connected to a sealing connection portion 360 stepped with the sealing portion 330 so that when the sealing portion abuts three sides to enclose the electrode assembly 100, the step of the sealing connection portion 360 may be placed on the electrode assembly 100 to assist it. Accordingly, the receiving position of the electrode assembly 100 may be fixed by the receiving portion 340. Therefore, the receiving position of the electrode assembly 100 may be fixed by the receiving portion 340.

Here, the non-zero angle determined in advance formed by the receiving portion 340 and the forming portion 310 may be formed such that the sealing protrusion may be located at a position higher than a bottom surface of the forming portion 310 according to a shape in which the notch portion 320 is folded when the pouch case 300 seals the electrode assembly 100.

Figure 7:
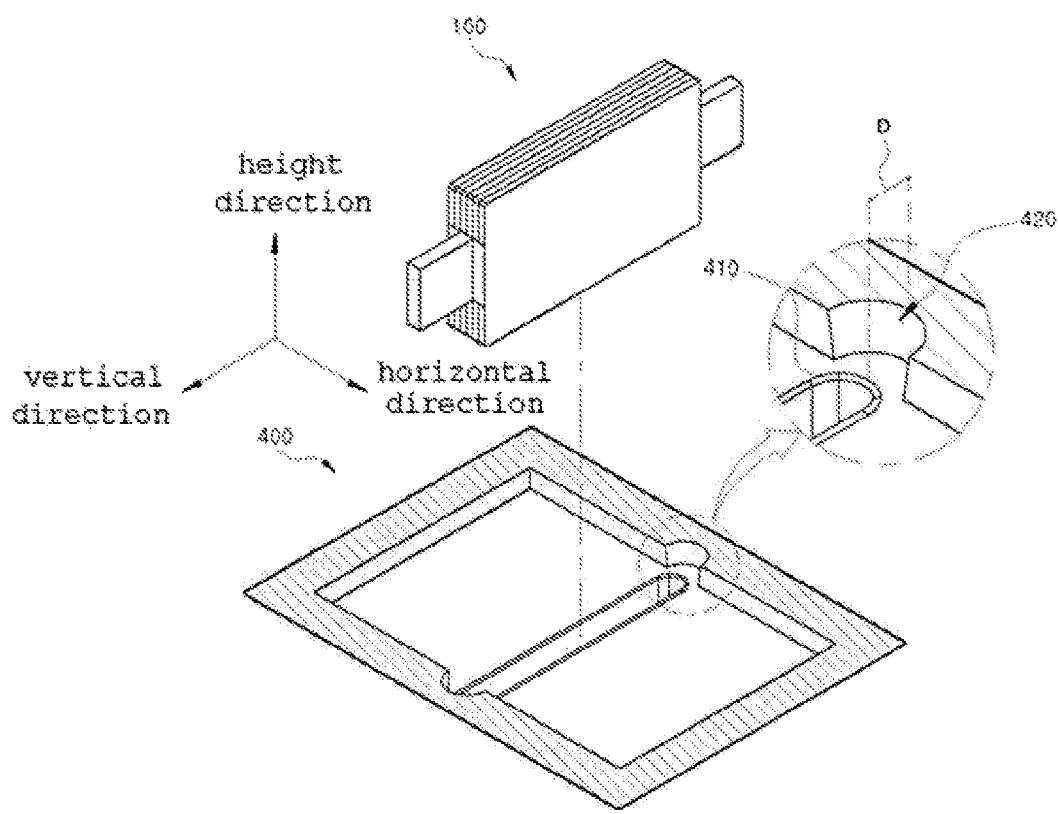
FIG. 7 is a perspective view before sealing of a pouch type secondary battery according to a modification of the present disclosure.

Another Embodiment of Pouch Type Secondary Battery According to Present Disclosure FIG. 7 relates to a pouch type secondary battery according to another embodiment of the present disclosure, which includes an electrode assembly 100 and a pouch case 400, and the pouch case 400 includes a forming portion 410, a notch portion 420, a sealing portion 430, and the receiving portion 440.

The notch portion 420 may be spaced apart from opposing ends of the forming portion 410 and may be controlled to have a shape such that a sealing protrusion formed at the time of sealing is higher than a bottom of the forming portion 410. A distance D between the notch portion 420 and the forming portion 410 may be set as a distance over which a shape of the sealing protrusion formed at the time of sealing is controlled.

The notch portion 420 may be spaced apart from the forming portion 410 and protrude in a direction of opposing ends of the forming portion 410 in the vertical direction on the sealing portion 430 to have a step with respect to a bottom surface of the forming portion 410. The notch portion 420 may have various shapes other than the shape illustrated in FIG. 8A.

Figure 8A:
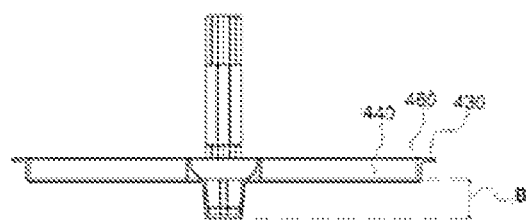
FIGS. 8A and 8B are a plan view and a side view, respectively, before sealing of a pouch type secondary battery according to a modification of the present disclosure.
Figure 8B:
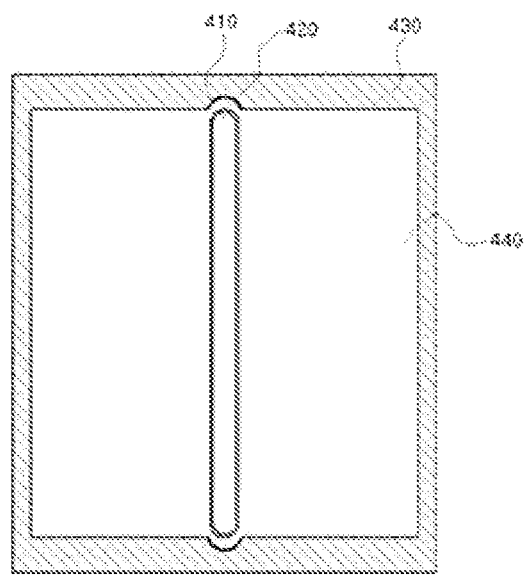

As shown in FIGS. 8A and 8B, the notch portion 420 may have a predetermined distance B from the bottom surface of the forming portion 410. Here, the predetermined distance B may be formed such that the sealing protrusion is formed at a position higher than the bottom surface according to an embodiment of the pouch case 400 after sealing the electrode assembly by measuring a metal laminate sheet, sealing process variable, and the like, so that a size of the sealing protrusion formed at the time of sealing the electrode assembly may be controlled. A depth of the notch portion 420 may be lower than that of the forming portion 410, and thus the predetermined distance B may be a positive or negative number. Further, the predetermined distance B may be applied to the pouch cases 200 and 300 described above.

Figures 3, 9:
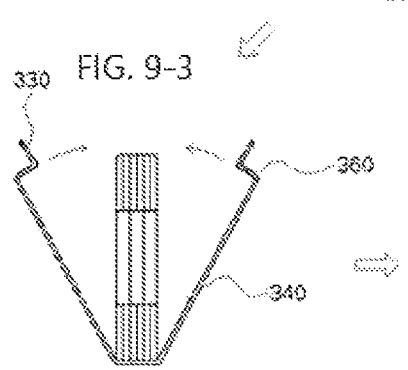
Figures 4, 9:

Hereinafter, a method of manufacturing the pouch type secondary battery 1000 of the present disclosure will be described with reference to FIGS. 9-1 to 9-4.

As illustrated in FIG. 9-1, the electrode assembly 100 is aligned with the pouch case 300. Thereafter, as shown in FIG. 9-2, the side of the electrode assembly 100 is inserted or disposed on the forming portion 310. Subsequently, as shown in FIG. 9-3, the pouch case 300 is folded based on the forming connection portions 350 on both sides. The receiving portion 340 preferably abuts the electrode assembly 100, and the receiving portion 340 is assisted to abut the electrode assembly 100 by the forming connection portion 350. Here, the sealing protrusion is formed through the notch portion 320. A shape of the sealing protrusion may be controlled through a detailed shape and numerical values of the notch portion 320. Thereafter, a heat-fusing process of the sealing portion 330 may be ready for the electrode assembly 100 through the sealing connection portion 360. Subsequently, as shown in FIG. 9-4, three sides of the sealing portion 330 are heat-fused to seal three sides of the electrode assembly 100 by the pouch case 300, thereby manufacturing the pouch type secondary battery 1000. Here, it is preferable to fill the inside of the pouch case 300 before the sealing portion 330 is completely sealed.

Figure 10A:
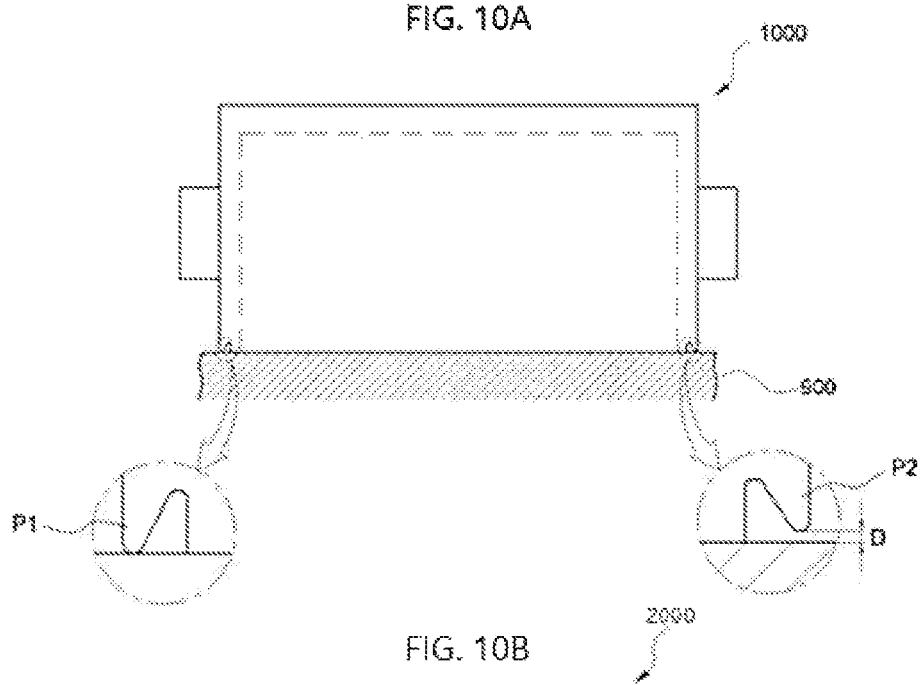
FIGS. 10A and 10B are views showing a packaged pouch type secondary battery and a secondary battery module of the present disclosure packaged.
Figure 10B:
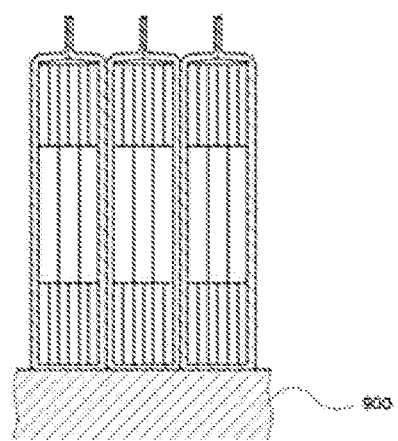

FIGS. 10A and 10B show a packaged pouch type secondary battery and secondary battery module of the present disclosure. As shown in FIG. 10A, the pouch type secondary battery 1000 of the present disclosure may be formed such that a surface corresponding to the forming portion is flat so as to be in close contact with a cooling plate 900. Here, sealing protrusions P1 and P2 are formed through the notch portion through the process described above. The sealing protrusions P1 and P2 may be controlled in shape and size through the notch portion, and further, the size and clearance distance D of the sealing protrusion P2 may be controlled through the notch portion to form a predetermined clearance distance D from the cooling plate 900.

Meanwhile, as shown in FIG. 10B, a pouch type secondary battery module 2000 of the present disclosure may be formed by arranging the cooling plate 900 and a plurality of pouch type secondary batteries 1000 in close contact with each other. Accordingly, heat occurring in the pouch type secondary battery 1000 may be easily transferred to the cooling plate 900, and since a shape of the sealing protrusions P1 and P2 is controlled through the notch portion, interference between the sealing protrusions P1 and P2 and the cooling plates 900 is reduced, thereby obtaining higher heat efficiency and higher energy density per unit area when the secondary batteries are stacked in a module, compared with the pouch type secondary battery 10 of the related art. Meanwhile, in the electrode assembly 100, electrode tabs may be drawn out in opposing directions of the electrode assembly 100, and a horizontal length of the electrode assembly 100 parallel to the direction of the electrode tabs drawn out in the opposing directions of the electrode assembly 100 may be larger than a length of the electrode assembly 100 in the height direction.

Hereinafter, a method of manufacturing the pouch type secondary battery 1000 according to the present disclosure will be described with reference to FIGS. 11A to 12D.

The method of manufacturing the pouch case 200, 300, or 400 includes a preparation step (S100), a sheet arrangement step (S200) and a forming step (S300). The details of each step are will be described.

First, the preparation step (S100) is a step of preparing a mold and a die for manufacturing the pouch case 200, 300, or 400. A punch for forming the pouch case 200, 300, or 400 is aligned with the die having a cavity formed at the center thereof. The punch is aligned to be inserted into the cavity of the die.

The sheet arrangement step (S200) is a step of arranging a metal laminate sheet that may form the pouch case 200, 300, or 400 on an upper surface of the die.

The forming step (S300) is a step of forming a shape corresponding to the pouch case 200, 300, or 400 by pressing the metal laminate sheet with the punch. Preferably, mechanical properties of the metal laminate sheet are measured and predicted, and the pouch case 200, 300, or 400 is formed with the punch with a predetermined temperature, pressure and pressing conditions in a single process.

The pouch case 200, 300, or 400 of the present disclosure may be formed in a single process through the preparation step (S100) to the forming step (S300). Unlike deep drawing in which a pouch case is formed through repeated pressing of sequential punching several times, in the present disclosure, a blank holder may be omitted and the process of punching several times may be omitted, thereby reducing cost and maximizing production efficiency in mass-production in a line process.

After the pouch case 200, 300, or 400 is formed, an electrode assembly inserting step (S400) of inserting and aligning the electrode assembly 100 in the forming portion 210, 310, or 410 of the pouch case 200, 300, or 400 and a pouch case sealing step (S500) of sealing the sealing portion 230, 330, or 430 of the pouch case 200, 300, or 400 are performed to manufacture a secondary battery. Here, in the process of manufacturing the pouch type secondary battery of the present disclosure, the uneven portion is formed such that a protruding or depressed form of the uneven portion is maintained in the process of packaging the electrode assembly with the pouch case, and the uneven portion may be formed such that the protruding or depressed form is spread at the time of sealing the pouch case.

FIGS. 11A to 11D show some embodiments of manufacturing the pouch case 200 of the present disclosure. As for the pouch case 200, a metal laminate sheet 500 is disposed on a die 600 having a cavity formed at the center, and additionally, a support member 610 for forming a detailed shape of the pouch case 200, i.e., a shape of the forming connection portion 250 and the sealing connection portion 260 may be disposed. Thereafter, the laminate sheet 500 is pressed under predetermined conditions reflecting mechanical properties of the metal laminate sheet 500, i.e., pressing conditions such as a temperature or a pressure, and thereafter, a shape corresponding to the forming portion 210, the notch portion 220, and the receiving portion 240 is pressed and formed on the metal laminate sheet 500 through a punch 700 to manufacture the pouch case 200. The punch 700 may include protrusions 710, 710a, and 710b protruding outward to form the notch portion 220.

Figure 11A:
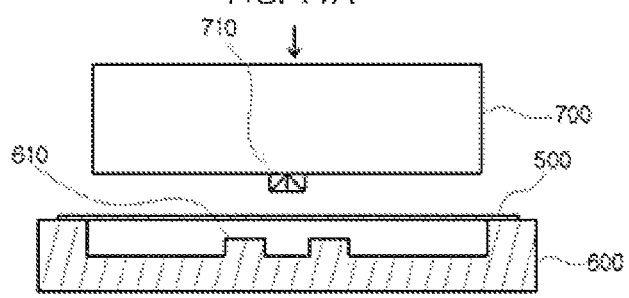
FIGS. 11A to 11D are views showing a method of manufacturing a pouch case according to an embodiment of the present disclosure.
Figure 11B:
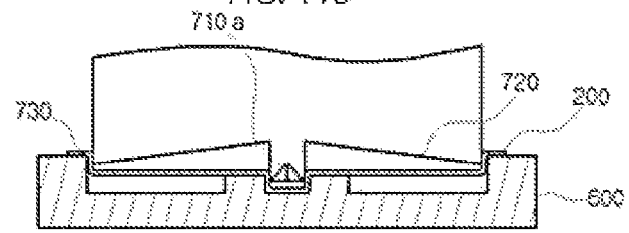
Figure 11C:
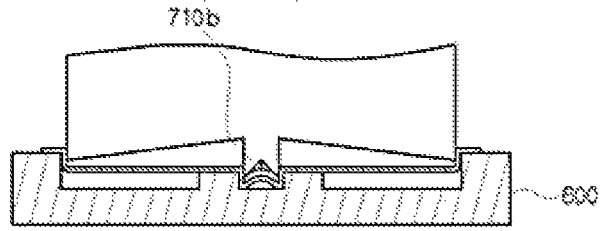
Figure 11D:
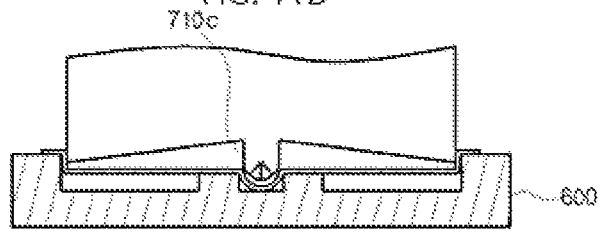
Figure 12A:
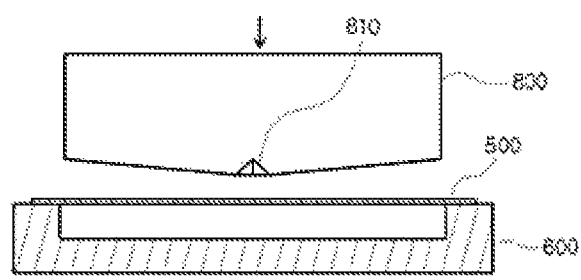
FIGS. 12A to 12D are views showing a method of manufacturing a pouch case according to another embodiment of the present disclosure.
Figure 12B:
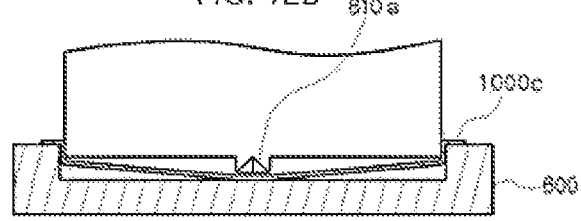
Figure 12C:
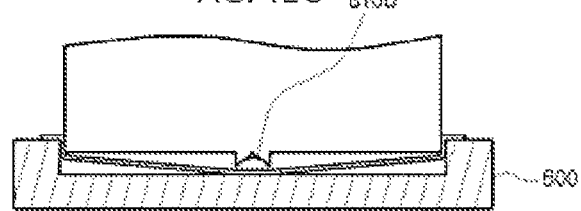
Figure 12D:

As illustrated in FIGS. 11A and 11B, preferably, a detailed shape of the punch 700 is formed to correspond to the shape of the uneven portion 213 formed on the lower surface of the forming portion 210. In addition, the same shape may also be formed by simply pressing the forming portion 210 and the sealing connection portion 260 formed on the metal laminate sheet 500 with the punch 700 capable of forming the pouch case 200 illustrated in FIGS. 11A to 11D. Therefore, in an embodiment, the punch 700 may include an inclined surface 720. In addition, a portion of the punch 700 brought into contact with the metal laminate sheet 500 may be formed of a bent portion 730 to prevent breakage.

FIGS. 12A to 12D show another embodiment of manufacturing the pouch case 300 of the present disclosure. In the pouch case 300, the forming connection portion 350 and the sealing connection portion 360 forming the receiving portion 340 for a predetermined angle, and the punch 800 may have a shape corresponding thereto. The punch 800 may include protrusions 810, 810a, 810b, and 810c that protrude outward to form the notch portion 320. In addition, like the shape of the punch 800 shown in FIGS. 12A to and 12C, the pouch case 300 of the present disclosure may be formed in the shape of a minimal punch 800 forming the pouch case 300.

The present disclosure is not limited to the embodiments described above and the scope of application is diverse, and various modifications can be implemented without departing from the gist of the present disclosure as claimed in the claims. The present disclosure may be variously modified and have various embodiments. Although specific embodiments are illustrated in the drawings and described in detail, they are not intended to limit the present disclosure to specific embodiments and it is to be understood that all modifications, equivalents, or substitutes are included in the technical scope and the spirit of the present disclosure.

DETAILED DESCRIPTION OF MAIN ELEMENTS

1000: secondary battery
2000: secondary battery module
100: electrode assembly
200, 300, 400: pouch case
210, 310, 410: forming portion
220, 320, 420: notch portion
230, 330, 430: sealing portion
240, 340, 440: receiving portion
250, 350: forming connection portion
260, 360: sealing connection portion
211: bottom portion
212a, 212b: height portion
500: metal laminate sheet
600: die
610: support member
700, 800: punch
900: cooling plate
10: pouch type secondary battery of related art
1: electrode assembly
2: pouch case
2a: receiving portion
2b: sealing portion
3: sealing protrusion

What is claimed is:

1. A pouch case for enclosing an electrode assembly including a plurality of electrode bodies stacked with a separator interposed therebetween, the pouch case comprising:
a forming portion formed to have a predetermined depth at a center and accommodating one edge of the electrode assembly;
a sealing portion provided at an outer periphery of the forming portion and sealing the accommodated electrode assembly;
a notch portion provided in the sealing portion at opposing ends of the forming portion in a vertical direction; and
a receiving portion brought into surface contact with a side surface of the electrode assembly when the pouch case is sealed,
wherein the forming portion includes a bottom portion in which the edge of the electrode assembly is seated, and
the receiving portion is connected at both ends of the forming portion and includes a forming connection portion formed on one side and connected to the forming portion and a sealing connection portion formed on the other side and connected to the sealing portion to have a predetermined angle with respect to the forming portion,
wherein the notch portion is spaced apart from the opposing ends of the bottom portion of the forming portion by a predetermined interval to have a step with the bottom portion.

2. The pouch case of claim 1, wherein
the bottom portion of the forming portion and the one edge of the electrode assembly are in contact with each other.

3. A secondary battery module including a pouch type secondary battery including an electrode assembly including a plurality of electrode bodies stacked with a separator interposed therebetween and the pouch case of claim 1; and
a cooling plate cooling the pouch type secondary battery,
wherein the forming portion of the pouch case is in surface contact with the cooling plate.

4. The pouch case of claim 1, wherein
a sealing protrusion is formed on the sealing portion through the notch portion when the pouch case is sealed,
the sealing protrusion is located at a position higher than a bottom surface of the forming portion.

5. A method of manufacturing a pouch type secondary battery of claim 1, the method comprising:
a sheet arrangement operation of disposing a metal laminate sheet;
a forming operation of pressing the sheet with a punch to form a shape of a pouch case in a single process under preset temperature and pressure pressing conditions by predicting measured mechanical properties of the sheet;
an electrode assembly insertion operation of inserting and aligning one edge of an electrode assembly to the forming portion of the pouch case; and
a pouch case sealing operation of sealing the sealing portion of the pouch case.

6. The method of claim 5, further comprising:
a preparation operation of preparing a die having a cavity formed at a center before the sheet arrangement operation,
wherein the forming operation is performed by pressing the punch between the cavity after the sheet arrangement operation.

* * * * *